(12) United States Patent
Land et al.

(10) Patent No.: US 9,815,718 B2
(45) Date of Patent: Nov. 14, 2017

(54) METHOD OF CONTROLLING ADDITION RATE OF AN ODOR CONTROL CHEMICAL

(71) Applicant: KEMIRA OYJ, Helsinki (FI)

(72) Inventors: Greg Land, Yacolt, WA (US);
Roderick Abinet, Scottsdale, AZ (US);
David Soper, Gastonia, NC (US)

(73) Assignee: Kemira Oyj (FI)

( * ) Notice: Subject to any disclaimer, the term of this patent is extended or adjusted under 35 U.S.C. 154(b) by 123 days.

(21) Appl. No.: 13/757,487

(22) Filed: Feb. 1, 2013

(65) Prior Publication Data

US 2013/0220939 A1 Aug. 29, 2013

Related U.S. Application Data

(60) Provisional application No. 61/594,381, filed on Feb. 3, 2012.

(51) Int. Cl.
*C02F 1/58* (2006.01)
*C02F 1/00* (2006.01)
*C02F 1/52* (2006.01)

(52) U.S. Cl.
CPC ............... *C02F 1/58* (2013.01); *C02F 1/008* (2013.01); *C02F 1/5245* (2013.01);
(Continued)

(58) Field of Classification Search
CPC .... C02F 1/008; C02F 1/20; C02F 1/58; C02F 1/5236; C02F 1/5245; C02F 1/5281; C02F 1/66; C02F 1/72; C02F 1/76; C02F 2103/002; C02F 2103/005; C02F 2103/007; C02F 2103/18; C02F 2103/20; C02F 2103/365; C02F 2101/101; C02F 2209/001; C02F 2209/003; C02F 2209/005; C02F 2209/0006; C02F 2209/02; C02F 2209/06; C02F 2209/08; C02F 2209/26;
(Continued)

(56) References Cited

U.S. PATENT DOCUMENTS 4,544,489 A 10/1985 Campbell et al.
4,823,826 A * 4/1989 Sacco ............................. 137/1
(Continued)

OTHER PUBLICATIONS

"In Vitro." Merriam-Webster.com. Merriam-Webster, n.d. Archived from May 1, 2007, accessed. Dec. 9, 2014. <http://www.merriam-webster.com/dictionary/in vitro> (archival copy availiable at http://web.archive.org/web/20070501033050/http://www.merriam-webster.com/dictionary/in+vitro).*
(Continued)

*Primary Examiner* — Lucas Stelling
*Assistant Examiner* — Angel Olivera

(57) ABSTRACT

A method of controlling addition rate of an odor control chemical to a wastewater line by adding odor control chemical to the wastewater. The method includes measuring a level of dissolved sulfides in the wastewater line using a sulfide probe placed in said wastewater line, transferring data on the level of dissolved sulfides to a computing unit, determining a required odor control chemical addition rate in said computing unit based on said level of dissolved sulfides, and adding the odor control chemical at said required addition rate. The method allows for accurate on-line control of the level of $H_2S$ in the wastewater line.

17 Claims, 1 Drawing Sheet

(52) U.S. Cl.
CPC .. *C02F 2209/001* (2013.01); *C02F 2209/003* (2013.01); *C02F 2209/005* (2013.01); *C02F 2209/02* (2013.01); *C02F 2209/06* (2013.01); *C02F 2209/08* (2013.01); *C02F 2209/265* (2013.01); *C02F 2209/40* (2013.01); *C02F 2303/02* (2013.01); *C02F 2307/08* (2013.01)

(58) Field of Classification Search
CPC ............ C02F 2209/265; C02F 2209/40; C02F 2303/02; C02F 2307/08; C02F 2307/14; C02F 1/5209; C02F 1/705; C02F 2101/40
USPC ....... 210/702, 709, 721, 723, 724, 739, 742, 210/749, 750, 754, 758, 98, 101, 103, 210/105, 170.03, 170.08, 170.1, 199, 916
See application file for complete search history.

(56) References Cited

U.S. PATENT DOCUMENTS

| | | | |
|---|---|---|---|
| 5,003,814 A | | 4/1991 | Crawford et al. |
| 7,273,561 B1* | | 9/2007 | Palmer ........................ 210/742 |
| 2004/0173525 A1* | | 9/2004 | Hunniford et al. .......... 210/610 |
| 2005/0224409 A1 | | 10/2005 | Harshman et al. |
| 2007/0074758 A1 | | 4/2007 | McQuade et al. |
| 2007/0215556 A1* | | 9/2007 | Kim ............................. 210/739 |

OTHER PUBLICATIONS

Sutherland-Stacey et al., Continuous Measurement of Dissolved Sulfide in Sewer Systems, Water Science and Technology, 57.3 (2008), pp. 375-381.*

"Probe." Merriam-Webster.com. Merriam-Webster, n.d. Archived from Jun. 23, 2007, accessed. Dec. 11, 2014, http://merriam-webster.com/dictionary/probe (archival copy availiable at https://web.archive.org/web/20070623225846/http://merriam-webster.com/dictionary/probe).*

Guenther et al., Direct Ultraviolet Spectrophotometric Determination of Total Sulfide and Iodide in Natural Waters, Anal. Chem. 73, 3481-3487 (2001).*

"H2S removal and odor control" General Chemical, Archived from Nov. 13, 2010, accessed Jul. 9, 2015, <http://www.generalchemical.com/H2S-removal-and-odor-control.html> (archival copy available at http://web.archive.org/web/20101113213858/http://www.generalchemical.com/H2S-removal-and-odor-control.html).*

Pope, "Collection System Odors—Going with the Flow", Malcolm Pirnie Inc. , Jun. 1996, pp. 12, XP008026461, Air & Waste Management Association, Nashville, TN.

Search Report for International application PCT/FI2013/050105, mailing date Apr. 23, 2013, 4 pages.

Weismann et al., Sulfid-Praxishandbuch der Abwassertechnik, Jan. 1, 2007, 90 pages, Vulkan-Verlag GmbH, Essen, Germany.

* cited by examiner

METHOD OF CONTROLLING ADDITION RATE OF AN ODOR CONTROL CHEMICAL

RELATED APPLICATIONS

This application claims the benefit of U.S. Provisional Patent Application No. 61/594,381, filed Feb. 3, 2012, which is incorporated by reference herein in its entirety.

FIELD OF THE INVENTION

The invention relates to treatment of water especially in wastewater lines. In particular, the invention relates to controlling the addition rate of odor control chemical dosed to a wastewater line. The invention also relates to a controlling system.

BACKGROUND OF THE INVENTION

Sulfides dissolved in wastewater cause problems in wastewater lines, one of the most remarkable of which is bad odor. Dissolved sulfides, like hydrogen sulfide $H_2S$, are generated when organic matter in the wastewater lines are degraded through anaerobic digestion by bacteria. The level of sulfides can however be controlled using suitable chemicals.

Previously, the level of sulfides has been indirectly estimated on the basis of atmospheric levels of $H_2S$ nearby the actual wastewater flow. The atmospheric levels have been used to control pumps that are arranged to feed odor control chemical to the wastewater line. This method is not as accurate as correlating feed rates to an actual dissolved sulfides level. Also physical grab samples have been taken to measure dissolved sulfides levels (e.g. by using a methylene blue test kit). Both these methods have involved a lot of measurement data and still automatic control has not been achieved, but manual control has been necessary. Also, the previous methods have not been real-time.

Thus, there exists a need for improved control methods and systems.

SUMMARY OF THE INVENTION

It is an aim of the invention to solve at least some of the abovementioned problems and to provide an improved method and system for controlling wastewater flows with respect to sulfide levels.

The aim is achieved by the method and system according to the independent claims.

The invention provides significant advantages. Indeed, the inventors have found that the dissolved sulfide level is the only parameter that allows for dosing odor control chemicals, typically iron salts, properly. The present technology involves the use of a dissolved sulfide measurement device that will collect data and feed it back to a pump that can adjust iron salt feed for optimized odor control. The controlling is thus not anymore based on an indirect estimate or old grab sample but a real time measurement.

DETAILED DESCRIPTION OF EMBODIMENTS

Figure 1:
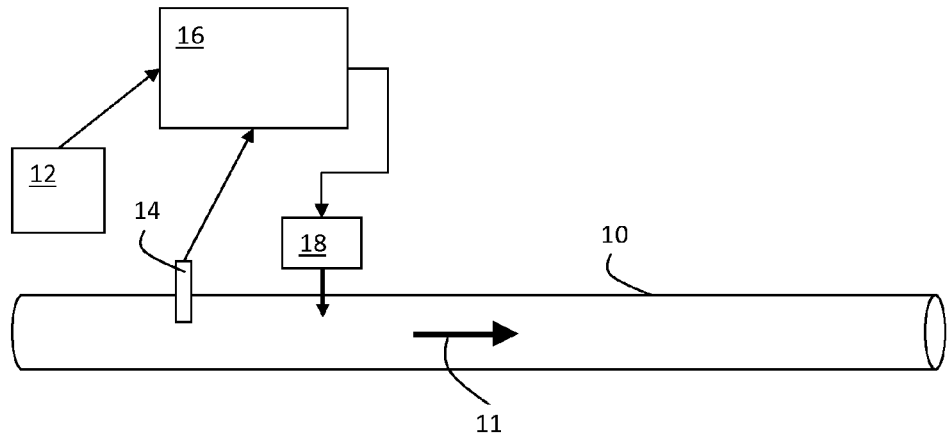
FIG. 1 shows a schematic illustration of one embodiment of the invention.

With reference to FIG. 1, and as briefly discussed above, the present method is applied in a wastewater line 10 comprising means 18 for adding odor control chemical to the wastewater stream 11. The wastewater line 10 can be a municipal main line or a branch/root line. Usually, the line is a large line where the total flow amounts to at least 1 million liters/day, typically at least 10 million liters/day and even at least 30 million liters/day.

The present system is primarily designed to regulate the chemical dose rate applied to a wastewater stream for treatment of nuisance atmospheric $H_2S$ levels at a certain point of the line downstream the dosing point.

According to one embodiment, the method comprises measuring a level of dissolved sulfides in the wastewater line using a sulfide probe 14 placed in said wastewater line, the sulfide probe providing a signal (via an ethernet cable to an electronic box display) which is proportional to the true weight (per volume) of the sulfide content of the wastewater stream. The signal is transferred to a computing unit 16 (via another ethernet cable, a digital 485 cable, or an analog twisted wire pair terminal block), such as a general industrial process control computer or SCADA (Supervisory Control And Data Acquisition) unit. Other parameters descriptive of the wastewater stream for the computing unit may be provided also from respective measurement units, denoted with a reference numeral 12.

The computing unit 16 is programmed, using suitable software, to determine a required odor control chemical addition rate based on said level of dissolved sulfides. For this purpose, there is a suitable algorithm coded in the software.

Finally, the computing unit 16 is adapted to provide an electric signal instructing the means 18 for adding odor control chemical to at said required addition rate to the wastewater stream 11. As a simple example, the signal may be a provided through an analog hard wire.

Additional parameters which may be needed, and typically are needed for accurate control, include current flow magnitude of the wastewater stream, the pH of the wastewater stream, biochemical oxygen demand (BOD) levels, the temperature of the wastewater stream and the composition of the odor control chemical used. Some or all of these parameters may be used.

The target of control may be suitably chosen, e.g. to provide the amount of dissolved sulfides or odor problems (atmospheric sulfide levels) to an acceptable level. The target chosen naturally also affects the amount of chemical required.

According to one embodiment, the computing unit is adapted to set the addition rate to a level that brings the level of dissolved sulfides, in particular $H_2S$, to a level of less than 5 parts per million by weight (ppm), in particular less than 2 parts per million by weight (ppm) in the wastewater line. In terms of concentration, a preferred target range for dissolved sulfides is less than 0.25 mg/l, in particular less than 0.1 mg/l.

According to one embodiment, the system comprises also means for sending the measurement data of the measurement probe through a wired or wireless (e.g. GPRS) channel to a database server for analysis and processing in real time.

According to one embodiment, the sulfide probe is based on spectrophotometer technology. The measurement principle of the sulfide probe is preferably UV-spectrometry. According to one embodiment, the probe is a S::CAN SPECTRO::LYSER™ probe which can be mounted to a wastewater line quite easily under almost any conditions.

If the pH is expected to be constant, no separate pH measurement is needed. However, if pH is fluctuating, an additional pH probe is required for compensation.

The measuring step can be repeated at constant or non-constant time intervals which typically do not exceed 30 minutes, being most typically 10 minutes or less. Repeated measurements falling within the abovementioned periods are herein called "continuous" measurements despite their repeated nature. Of course, the measurement can be also truly continuous, but there is typically no need for this at least in main wastewater lines, where the fluctuations of wastewater composition are relatively slow.

According to one embodiment, the actual controlling, i.e. dose determination and dosing, is carried out in real time with said measuring. The term "real time" as herein used covers a time delays less than 60 minutes, which is a considerably shorter delay and in known prior art methods. Typically, the delay is of the order of 0-5 minutes.

According to one embodiment, the computing unit is adapted to utilize wastewater line retention time when determining the required odor control chemical addition rate. Thus, the system accounts for the period that the bacterial sulfide reactions and reactions between the sulfides and the odor control chemical take place. This improved the accuracy of control. The retention time can be estimated based on the flow magnitude and wastewater line properties.

According to one embodiment, the measurement comprises
  measuring the actual weight of dissolved sulfides in the wastewater line or a parameter correlating with said actual weight,
  determining the required odor control chemical addition rate based on the actual weight or parameter correlating with said actual weight.

According to one embodiment, the computing unit is programmed to take into account sulfide generation downstream of the addition point of the odor control chemical. This usually involves the addition of odor control chemical at a rate which is significantly higher than the direct measurement would indicate. The factor may be 1.2 or higher.

Figure 2:
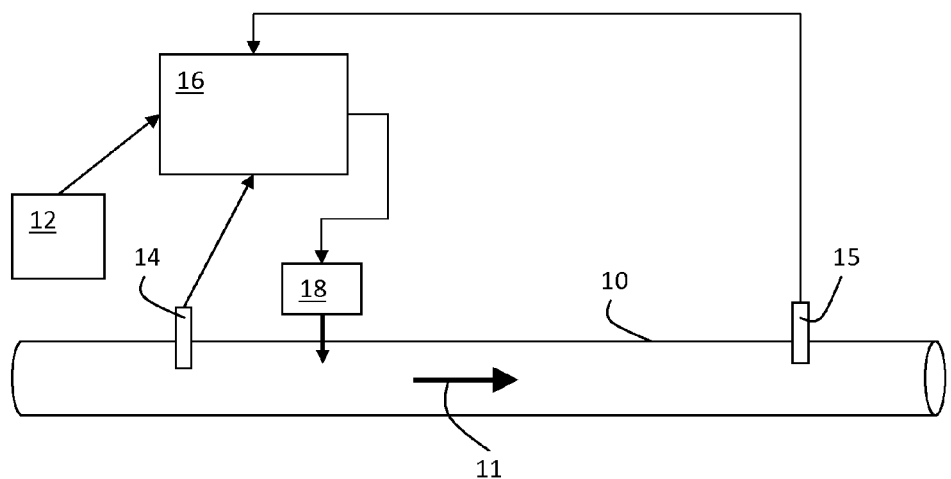
FIG. 2 shows a schematic illustration of another embodiment of the invention.

In one embodiment, the measurement point of the level of dissolved sulfides is upstream of the addition point of the odor control chemical. This allows for predictive control of chemical addition. In another embodiment, the measurement point of the level of dissolved sulfides is downstream of the addition point of the odor control chemical, or there may be measurement points both upstream and downstream of the addition point of the odor control chemical. FIG. 2, otherwise similar to FIG. 1, shows a downstream measurement probe 15.

If there is a measurement point located downstream of the addition point, the controlling can be implemented using a feedback loop. Thus, at least some of the changes caused by the odor control chemical in the composition of the wastewater are detected by the sulfide probe and the changes are taken into account in the computing unit for driving the means for adding the odor control chemical. This is especially important when choosing an iron salt. Ferrous Iron ($Fe^{2+}$) will preferentially choose sulfides forming FeS and $FeS_2$ first, over other contaminants, i.e. phosphates or other negative colloids.

Here an upstream probe measuring dissolved sulfides can be used to supply a more accurate dosage rate of Ferrous Iron.

Ferric Iron ($Fe^{3+}$) is less selective and will react with other contaminants like phosphorus, TSS (total suspended solids) and BOD while simultaneously reacting with sulfides either as $Fe_2S_3$ or in its reduced ferrous form reacting with sulfides as described above. Here an upstream and downstream dissolved sulfide probe should be used to more accurately dose Ferric Iron, taking into account all Ferric Iron demand. The downstream measurement point is located far enough away from the addition point to ensure sufficient mixing time. Mixing can occur within minutes or hours, depending on the levels of dissolved iron in $Fe^{2+}$ and contaminants.

In one embodiment of the invention the probes will be placed in vitro, directly into the flow of wastewater both untreated (without treatment chemicals) and treated (with chemicals). In another embodiment of the invention, the probes can be placed outside the flow with intermittent pumping of raw and treated samples over the probes.

In one embodiment, the measurement is carried out using a dissolved sulfide measurement probe capable of providing a signal which is relative to sulfide weight (including weight per volume) in the wastewater flow. Weight-based measurements provide very accurate information for evaluation of the odor control chemical need. In a preferred embodiment, the weight ratio of dissolved sulfides to relevant active components in the chemical is calculated for determining the required odor control chemical addition rate.

In one embodiment, the odor control chemical comprises an iron salt. In this case the weight ratio of sulfides to elemental iron in the iron salt is decisive when evaluating the iron salt need. In one embodiment, the iron salt is selected from the group of ferrous chloride, ferric chloride, blend of ferrous/ferric chloride, ferrous sulfate, ferric sulfate, blend of ferrous/ferric sulfate, ferric nitrate, or other blend thereof.

According to a preferred embodiment, the odor control chemical is $FeCl_2$.

In one embodiment, the method comprises measuring the pH, temperature and/or total flow of wastewater in the wastewater, and taking into account the pH, temperature and/or total flow of wastewater in the control unit when determining the required addition rate of the odor control chemical.

In one embodiment, the computing unit is used to automatically control the dosage rate of odor control chemical.

According to one embodiment, the computing unit is adapted to determine the required odor control chemical addition rate so as to be at least 7 times greater than the measured level of dissolved sulfides (weight to weight ratio of active salt, e.g. $FeCl_2$ to dissolved sulfides, in particular $H_2S$).

In one embodiment, the computing unit is adapted to use a non-linear formula for determining the odor control chemical addition rate based on the level of dissolved sulfides. In particular, the required odor control chemical addition rate to measured dissolved sulfide level ratio (weight to weight) can be progressively increased with decreasing level of dissolved sulfides, the ratio preferably being less than 10:1 with at least a first dissolved sulfide level and more than 80:1 with at least a second dissolved sulfide level smaller than the first dissolved sulfide level.

In one embodiment, the odor control chemical is added into a mixing sleeve in the wastewater line.

The invention can be utilized for example in wastewater treatment systems having an average throughput of 0-200 $m^3/s$, typically 1-50 $m^3/s$, for example 10-40 $m^3/s$.

Example 1

A probe is used to measure the soluble sulfide amount at point A. This amount may be expressed as an mg/l value (milligrams soluble sulfide per liter wastewater, ="probe mg/l S"). This value is automatically fed into a SCADA programmable logic controller (PLC) at predefined intervals (e.g. 5 minute intervals). The example value is "2".

The mg/l soluble sulfide generated by the sulfur reducing bacteria from point A to point B has been predetermined by field measurements (="line generation mg/l S"). This value is entered into the SCADA (PLC). An example value is "3".

The (probe mg/l S)+(line generation mg/l S)=(total mg/l soluble S) required for treatment. An example value is "5".

The (mg/l of iron salt) per (mg/l soluble S) value has been predetermined in the laboratory. This is the (treatment factor multiple). This is entered into the SCADA PLC. An example value is "10".

The chemical feed dose is auto calculated (for example every time the probe samples the mg/l soluble S at point A) as indicated below. Using the example values indicated above, the chemical dose required is calculated as ((Probe mg/l S)+(line generation mg/l entered value))×(treatment factor multiple)=2*3*6=60 mg/l This gallon per minute (gpm) iron salt delivery is then calculated to meet these parameters using million gallons per day (MGD) input from flow measuring device and sent to the iron salt feed pump speed controller.

The invention claimed is:

1. A method of controlling an addition rate of an odor control chemical comprising an iron salt to a wastewater line, comprising:
    measuring a level of dissolved sulfides in the wastewater line based on a signal proportional to a true weight of sulfide per volume using a spectrophotometric sulfide probe placed in the wastewater line;
    calculating a required odor control chemical addition rate based on a desired ratio of the measured dissolved sulfides to an amount of elemental iron in the iron salt, said required odor control chemical addition rate being at least 7 times the measured level of dissolved sulfides by a weight to weight ratio of the elemental iron in the iron salt to the dissolved sulfide; and
    adding in real time with said measuring the odor control chemical comprising the iron salt to the wastewater line at the required odor control chemical addition rate, wherein a time delay between the measuring the level of dissolved sulfides, calculating the required odor control chemical addition rate, and adding the odor control chemical, is less than 60 minutes.

2. A method of controlling an addition rate of an odor control chemical comprising an iron salt to a wastewater line, comprising:
    measuring a level of dissolved sulfides in the wastewater line based on a signal proportional to a true weight of sulfide per volume using a spectrophotometric sulfide probe placed in the wastewater line;
    calculating a required odor control chemical addition rate based on a desired ratio of the measured dissolved sulfides to an amount of elemental iron in the iron salt, wherein a ratio of the required odor control chemical addition rate to the measured level of dissolved sulfides is progressively increased with decreasing level of dissolved sulfides, the ratio being less than 10:1 with at least a first dissolved sulfide level and more than 80:1 with at least a second dissolved sulfide level smaller than the first dissolved sulfide level; and
    adding in real time with said measuring the odor control chemical comprising the iron salt to the wastewater line at the required odor control chemical addition rate, wherein a time delay between the measuring the level of dissolved sulfides, calculating the required odor control chemical addition rate, and adding the odor control chemical, is less than 60 minutes.

3. The method according to claim 1 or claim 2, wherein a computing unit is adapted to utilize wastewater line retention time when determining the required odor control chemical addition rate.

4. The method according to claim 1 or claim 2, wherein a computing unit is programmed to take into account sulfide generation downstream of the addition point of the odor control chemical.

5. The method according to claim 1 or claim 2, wherein the measuring, and calculating are arranged so as to provide an automatic feedback loop, controlled by a computing unit, to drive the adding of the odor control chemical.

6. The method according to claim 1 or claim 2, wherein said spectrophotometric sulfide probe is capable of providing a signal which is relative to the sulfide weight in the wastewater flow.

7. The method according to claim 1 or claim 2, wherein the iron salt is selected from the group of Ferrous Chloride, Ferric Chloride, blend of Ferrous/Ferric Chloride, Ferrous Sulfate, Ferric Sulfate, blend of Ferrous/Ferric Sulfate, Ferric Nitrate, or other blend thereof.

8. The method according to claim 1 or claim 2, further comprising
    measuring a pH, biochemical oxygen demand (BOD) level, temperature and/or total flow of wastewater in the wastewater,
    taking into account the pH, temperature and/or total flow of wastewater in a computing unit when determining the required addition rate of the odor control chemical.

9. The method according to claim 1 or claim 2, comprising measuring the level of dissolved sulfides upstream of said addition point of the odor control chemical.

10. The method according to claim 1 or claim 2, comprising measuring the level of dissolved sulfides at a downstream measurement point that is downstream of said addition point of the odor control chemical.

11. The method according to claim 1 or claim 2, comprising measuring the level of dissolved sulfides both upstream and downstream of said addition point of the odor control chemical.

12. The method according to claim 1 or claim 2, wherein the downstream measurement point is 2-10 km downstream of said addition point of the odor control chemical.

13. The method according to claim 1 or claim 2, wherein the downstream measurement point is 1-20 hours downstream of said addition point of the odor control chemical.

14. The method according to claim 1 or claim 2, wherein the odor control chemical added into a mixing sleeve in the wastewater line.

15. The method according to claim 1 or claim 2, wherein the required odor control chemical addition rate is determined so as to bring the level of dissolved sulfides, in particular $H_2S$, to a level of less than 5 ppm in the wastewater line.

16. The method according to claim 1 or claim 2, wherein the required odor control chemical addition rate is determined so as to bring the concentration of dissolved sulfides to a level of less than 0.25 mg/l.

17. The method according to claim 1 or claim 2, wherein the odor control chemical is $FeCl_2$.

* * * * *